Figure 1:
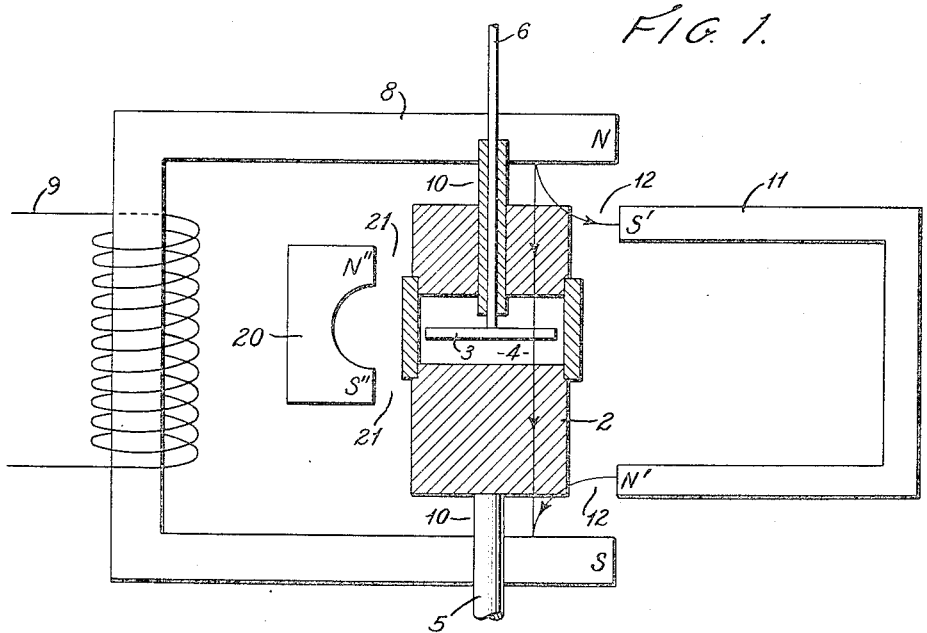

Jan. 22, 1957  E. G. PERRY, JR  2,778,466
MAGNETIC BRIDGE CIRCUIT TO CANCEL HYSTERESIS
EFFECTS IN MAGNETIC CLUTCHES
Filed May 1, 1953

INVENTOR
Edward Gordon Perry Jr.

BY *Stevens, Davis, Miller & Mosher*

ATTORNEYS

United States Patent Office 2,778,466
Patented Jan. 22, 1957

2,778,466

MAGNETIC BRIDGE CIRCUIT TO CANCEL HYSTERESIS EFFECTS IN MAGNETIC CLUTCHES

Edward Gordon Perry, Jr., Dallas, Tex., assignor to Texas Instruments Incorporated, Dallas, Tex., a corporation of Delaware Application May 1, 1953, Serial No. 352,420

4 Claims. (Cl. 192—21.5)

This invention relates to a magnetic bridge circuit to cancel hysteresis effects in magnetic clutches.

When a magnetic clutch is being used as a meter movement, the hysteresis effects in the magnetic material of the clutch are liable to cause errors. Such errors may be manifested in several ways. For example, in a magnetic fluid clutch of the type employing a field core and coil, signals applied to the field coil and core produce a residual magnetism or hysteresis effect in the core. This residual magnetism manifests itself by exerting a force on the magnetic fluid of the clutch after signals to the clutch have ceased. The reaction of the fluid, in turn, causes a displacement of the recording instrument from the zero position of the meter scale when no signal is being applied to the clutch. Also, the residual magnetism or hysteresis effect results in a residual magnetic field flux being generated in the core when a signal is applied which will tend to either aid or oppose the next signal flux, depending upon the polarity of the respective fluxes. This, of course, causes inaccurate measurements of the applied signals and should be avoided.

The phenomenon of hysteresis is due to irreversible processes in magnetic materials which result in energy dissipation producing heat. The effect of hysteresis is that when an initial exciting current is applied to a magnetic material by means such as a coil, a flux density is produced in the material proportional to the current applied; then as the current is removed by being decreased until it reaches zero, the flux normally produced by the current also decreases but it does not quite reach zero. There is left remaining a small residual amount of flux after the current has reached zero. This small amount of residual flux manifests itself as a residual magnetism. Should the residual magnetism possess a positive polarity it would require the application of a negative magnetizing force to decrease this residual magnetization to zero and vice versa.

It is, accordingly, an object of the present invention to provide a magnetic bridge circuit in a magnetic clutch to cancel out hysteresis effects in the magnetic clutch. By means of the magnetic bridge circuit, residual magnetism tending to affect the magnetic fluid in the clutch and thus cause erroneous output signals from the clutch is balanced by an opposing force supplied by a part of the magnetic circuit.

It is a further object of the present invention to provide a magnetic bridge circuit for use in magnetic clutches that will act to cancel hysteresis effects in the magnetic material of the clutch. Hence, a signal will not be indicated by the clutch when no signal is being applied to the clutch. Therefore, it is possible to obtain accurate measurements of applied signals.

It is a still further object of the present invention to provide a magnetic bridge circuit for use in magnetic clutches which will enable the clutch to operate more efficiently and effectively as a meter movement than has heretofore been possible.

Figure 2:
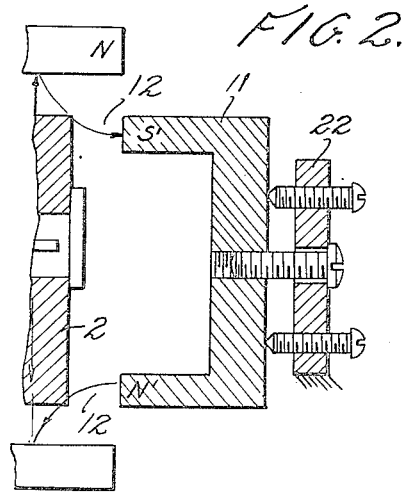

Other and further objects of the present invention will become apparent upon a detailed consideration of the following description when taken in conjunction with the drawing in which:

Figure 1 shows a schematic representation of a magnetic clutch arranged with a magnetic bridge circuit in accordance with the teachings of the present invention; and Figure 2 illustrates an adjustable bracket for mounting the magnetic bridge.

Referring to the drawing, there is shown a conventional magnetic fluid clutch consisting of a driving member 2 and a driven member 3 such as a torque disc. A working gap 4 is present between the members 2 and 3 in which is located magnetic fluid. The fluid may be an oil containing magnetic particles such as iron filings or it could be simply an iron powder. Connected to the driving member 2 is an input shaft 5 and connected to the driven torque disc 3 is an output shaft 6. The magnetic clutch is supported by means of bearings in a field core 8. The support bearings are not shown in Figure 1, however, it will be understood that such a support for a magnetic fluid clutch is entirely conventional and well known. A signal coil 9 is wound around the field core 8 and receives signals from an external source. These signals are used to control the operation of the magnetic fluid clutch and more particularly the coupling between the members 2 and 3. The clutch is supported by the bearings as aforementioned and is separated from the two ends of the field core 8 by means of air gaps 10. A magnetic bridge circuit is established by means of a core member 11 mounted in such a way that it is separated from the magnetic clutch by air gaps 12.

During normal operation of the magnetic fluid clutch, a signal is applied to the field coil 9 thus producing a magnetizing force in the field core 8, resulting in a flux being generated which passes through the air gap 10 at one end of the clutch, through the magnetic clutch members 2 and 3 and working gap 4, through the other air gap 10, thus completing the circuit. This flux causes a couple to be established between the two members 2 and 3 of the clutch thereby permitting the driven member 3 to be rotated with the driving member 2. By virtue of the core member 11, not all of the flux produced by the signal fed to the field coil 9 passes through the clutch members 2 and 3. A portion of this flux passes through the air gap 12, through the magnetic core 11, and re-crosses to the clutch through the other air gap 12 to complete the circuit with the field core 8. Thus, when the signal is removed from the field coil 9 there will be a residual magnetism in both the cores 8 and 11. Since the two cores 8 and 11 are arranged relatively to one another as shown, the residual magnetism present in one core will be proportional to the residual magnetism present in the other.

Another feature of this invention is that the magnetizing current applied to the field coil 9 will act upon cores 8 and 11 to produce two magnets with the north pole N of the core 8 adjacent the south pole S' of the core member 11 and the south pole S of the field core 8 adjacent the north pole N' of the core member 11 regardless of whether the direction of magnetization is clockwise or counter-clockwise. It is apparent that the polarity of the cores 8 and 11 shown in the drawing holds true for a current applied to the coil 9 in a certain direction. If the current is reversed, it is equally apparent that the opposite polarity will be produced at either end of the cores 8 and 11. After the signal has been removed from the field coil 9, the magnetic fluid and the clutch members 2 and 3 will be acted upon by the residual magnetism in the two core members 8 and 11 or the two magnets as they will now be considered. The magnet 8, with its flux lines passing from the north pole N to the south pole S through the clutch, will cause the fluid in the working gap 4 to become magnetized establishing a coupling between the clutch members 2 and 3. Therefore, the torque disc 3 and output shaft 6 will rotate with the driving member 2 and driving shaft 5 of the clutch. During normal operation the member 2 is constantly driven at all times. This coupling of members 2 and 3 will, of course, produce a displacement of the recording instrument connected to the output shaft 6 from the zero position of the meter scale thereby giving an erroneous positive reading since no signal is being applied to the field coil 9.

However, the flux lines in the magnet 11 will be passing from the north pole N' to the south pole S', also through air gaps 12 and the clutch members 2 and 3 and working gap 4. The flux lines from the magnet 11 will, as a result of the particular arrangement of the two core members 8 and 11, be in the opposite direction to the flux lines of the magnet 8. Consequently, the flux lines from the magnet 11 will oppose and tend to cancel the magnetizing effect on the clutch fluid in working gap 4 of the flux lines from the magnet 8. In order to achieve an exact balance between the forces acting on the clutch fluid in working gap 4, the widths of air gaps 10 and 12 can be and are varied. Since it is almost necessary to hold the core 8 in a relatively fixed position with respect to the clutch members 2 and 3, the core 11 is suitably mounted by means known to those skilled in the art to permit the widths of gaps 12 to be increased or decreased at will such as an adjustable mounting bracket 22 as shown in Figure 2.

While it is extremely desirable to employ a high permeability material for the magnetic cores 8 and 11 for the reason that less residual magnetism is retained by a high permeability material, the material for the magnetic structure is not to be limited thereby but any magnetic material may be employed. The cross sectional areas and lengths of the two magnetic paths 8 and 11 are not confined to any particular specific proportions to provide an effective balancing of forces. In fact it is nearly possible, within reason, to employ any cross sectional areas and lengths for the two magnetic paths through the cores 8 and 11. As above mentioned the most desirable way to achieve a balance of forces between the fluxes generated in the two core members 8 and 11 is to control the respective widths of their air gaps 10 and 12. Accordingly, as the length of the two cores 8 and 11 become equal, the air gap 12 is widened until it is almost equal to the air gap 10. Therefore, if the cores 8 and 11 are equal in length and have equal amounts of residual magnetism, the air gaps 10 and 12 will then be equal.

What has been said heretofore concerns principally the hysteresis effects produced in the field core 8. There will also be present a hysteresis effect in the clutch member. In order to insure absolute accurate operation of the clutch, the residual magnetism in the clutch member 2 must be cancelled or removed by some means.

Such a means is shown in Figure 1. It takes the form of a permanent bar magnet 20 located in a stationary position adjacent the clutch with the axis of the magnet 20 passing through the north and south poles of the magnet lying parallel to the long axis of the clutch. As the clutch rotates the flux issuing from the north pole N'' of the stationary permanent bar magnet 20 passes across the air gap 21, through the clutch members 2 and 3, across the air gap 21 back to the south pole S'' of the permanent magnet 20. While the direction of the flux lines being generated by the permanent magnet 20 remains constant, nevertheless, the relative direction of the flux lines as they pass through the clutch is constantly changing in direction. This serves to eliminate any hysteresis effects in the form of a residual magnetism that tend to be produced in the clutch itself. The permanent magnet 20 by means of its wiping action acts to remove residual magnetism in the clutch. This scheme for removing residual magnetism in the clutch itself by a permanent magnet is per se the subject of my co-pending patent application Serial No. 287,787 filed on May 14, 1952.

While the present invention has been shown and described in a single embodiment, nevertheless, various changes and modifications obvious to one skilled in the art are within the spirit, scope and contemplation of the present invention.

What is claimed is:

1. In a magnetic clutch including a driving member, a driven member coaxially mounted therewith and separated therefrom by a gap, a field core, and a field coil arranged to pass flux through said field core and axially through said driving member, gap, and driven member, the improvement which comprises a core member having one end mounted adjacent but spaced by an air gap from said field core and said driving member and its other end mounted adjacent but spaced by an air gap from said driven member whereby a portion of the flux passing through said field core during energization of said field coil will pass through said core member so that upon de-energization of said field coil, said core member, due to its residual magnetism, will pass a flux through said clutch members in opposition to the flux passing through said clutch members due to residual magnetism of said field core.

2. In a magnetic clutch as defined in claim 1, the further improvement of said core member being substantially U-shaped.

3. In a magnetic clutch as defined in claim 1, the further improvement of means mounting said core member to enable the width of said air gaps to be varied.

4. In a magnetic clutch as defined in claim 1, the further improvement of a magnet located adjacent said clutch members to eliminate and cancel hysteresis effects therein.

References Cited in the file of this patent
UNITED STATES PATENTS

| 1,169,475 | Finnigan | Jan. 25, 1916 |
| 2,615,945 | Jacschke | Oct. 28, 1952 |

FOREIGN PATENTS

| 129,318 | Sweden | Aug. 29, 1950 |